US000001544H

United States Statutory Invention Registration [19]

[11] Reg. Number: H1544

Miles

[45] Published: Jun. 4, 1996

[54] THERMAL BATTERY CELLS CONTAINING CATHODE MATERIALS IN LOW-MELTING NITRATE ELECTROLYTES

[75] Inventor: Melvin H. Miles, Ridgecrest, Calif.

[73] Assignee: The United States of America as represented by the Secretary of the Navy, Washington, D.C.

[21] Appl. No.: 563,130

[22] Filed: Aug. 6, 1990

[51] Int. Cl.[6] ..... H01M 4/58; H01M 6/20

[52] U.S. Cl. ..... 429/108; 429/106; 429/107; 429/109; 429/112; 429/202

[58] Field of Search ..... 429/102, 103, 429/106, 107, 108, 109, 112, 218, 220, 221, 223, 224, 202, 207

[56] References Cited

U.S. PATENT DOCUMENTS

| | | | |
|---|---|---|---|
| 4,260,667 | 4/1981 | Miles et al. | 429/112 |
| 4,416,958 | 11/1983 | Miles et al. | 429/103 |
| 4,528,253 | 7/1985 | McManis, III et al. | 429/112 |
| 4,535,037 | 8/1985 | McManis, III et al. | 429/112 |
| 4,668,594 | 5/1987 | Yamaura et al. | 429/194 |

OTHER PUBLICATIONS

M. H. Miles, et al., "Problems Associated with the Electrochemical Reduction of Metal Ions in $LiNO_3$–$KNO_3$ and $LiClO_4$–$KClO_4$ Melts", vol. 134, No. 3, Mar. 1987, pp. 614–620.

M. H. Miles, et al., "Cyclic Voltammetric Studies of Nitrato Complexes of Various Metal Ions in Molten $LiNo_3$+$KNO_3$ at 180° C.", J. Electroanal. Chem., vol. 221 (1987) pp. 115–128.

*Primary Examiner*—Charles T. Jordan
*Assistant Examiner*—J. R. Hardee
*Attorney, Agent, or Firm*—Melvin J. Sliwka; Stuart H. Nissim; Donald E. Lincoln

[57] ABSTRACT

The addition of cathode materials comprising $Cu^{++}$, $Fe^{+++}$, $Cr^{+++}$ or $Au^{+++}$, in the form of salts such as the nitrate or halide, e.g. $Fe(NO_3)_3$ or $CuCl_2$, to low melting nitrate electrolyte cells increases cell potential. Other ions such as $Co^{++}$, $Eu^{+++}$, $La^{+++}$, $Ni^{++}$, $Mn^{++}$, $Ce^{+++}$, $Pr^{+++}$, $Nd^{+++}$, $Gd^{+++}$, $Sm^{+++}$ and $Tb^{+++}$, in the form of salts thereof, can also be used, but yield smaller cell potentials. Such cathodic materials in the form of a suitable salt, such as a nitrate or halide, e.g. $Fe(NO_3)_3$ or $CuCl_2$, are added to low melting fused nitrate electrolytes, e.g. a $LiNO_3$, $KNO_3$ mixture, in a concentration sufficient to increase cell potential, using Li or Ca anodes. A suitable metal current collector such as a Ni screen can be used as a cathode. The above cathodic materials can be used in conjunction with other cathodic materials such as $AgNO_3$, which undergoes reduction to the free metal.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THERMAL BATTERY CELLS CONTAINING CATHODE MATERIALS IN LOW-MELTING NITRATE ELECTROLYTES

The invention described herein may be manufactured and used by or for the government of the United States of America for governmental purposes without the payment of any royalties thereon or therefor.

BACKGROUND OF THE INVENTION

1. Field of the Invention

This invention relates to the field of electrochemistry, and more particularly relates to thermally activated electrochemical cells having a low melting nitrate electrolyte containing novel cathode materials, resulting in an increase in cell potential.

2. Description of the Prior Art

Thermally activated electrochemical cells or batteries have been used quite extensively in military applications, such as a power source for arming devices, because of their long shelf life and compactness, and capability of withstanding shock and vibration. Batteries of this type typically include an electrolyte which, under normal storage conditions, is solid and does not conduct electricity. When the battery and/or the electrolyte is heated to a predetermined temperature, as by igniting a built-in pyrotechnic heat source such as an electric match, squib or percussion primer, the electrolyte, upon changing to a molten state, becomes conductive and ionically connects the electrodes to provide the desired electromotive force.

Nitrate salts have been proposed for use in thermal batteries because of their low melting points. See U.S. Pat. No. 4,260,667 to Miles and Fletcher. For example, potassium nitrate-lithium nitrate ($KNO_3$-$LiNO_3$) mixtures melt at temperatures as low as 124° C. The use of a lower melting electrolyte can shorten a battery's activation time and reduce the weight of heat sources and insulation.

A particular problem area of thermal battery cells is the lack of high performance cathode materials. Adding silver salts to electrolytes as cathode materials to improve cell potentials has previously been unsuccessful because the cathodic reactions involve the reduction of silver ions to the free metal in reversible electrode reactions, such as $$AgNO_3+e^- \leftrightarrows Ag+NO_3$$

Consequently, no net cathodic current can flow in such cells at cathode potentials more positive than the silver ion/silver reversible potential. Additionally, the added silver salts migrate and diffuse to the anode and form silver metal films on the anode surface that interfere with cell operation. Many divalent and trivalent metal ions cannot be used at high temperatures in molten nitrate electrolyte cells since they react rapidly with the nitrate melt to form the metal oxide.

U.S. Pat. No. 4,416,958 to Miles and Fletcher discloses a thermally activated electrochemical cell having a low melting point electrolyte. The electrolyte is composed of a layer of a mixture of lithium perchlorate and lithium nitrate adjacent the anode and of a layer of a mixture of lithium perchlorate, lithium nitrate, and silver nitrate adjacent to the cathode of the cell.

The article "Cyclic Voltammetric Studies of Nitrato Complexes of Various Metal Ions in Molten $LiNO_3$ +$KNO_3$ at 180° C." by M. H. Miles et al, J. Electoanal Chem., 221 (1987) 115–128, discloses addition of various metal ions such as $Co^{++}$, $Cu^{++}$, $Au^{+++}$, $Mn^{++}$, $La^{+++}$, and $Ce^{+++}$ ions to molten nitrates, and the effect of such additions.

However, the above article does not disclose or teach the application of the principles or concepts that are disclosed therein to thermal batteries, particularly employing lithium or calcium anodes.

One object of the invention accordingly is the provision of an improved thermal electrochemical cell.

Another object is to provide a novel thermal electrochemical cell utilizing low melting nitrate electrolytes.

A still further object is the provision of improved thermal electrochemical cells incorporating certain cathode materials in the electrolyte.

Yet another object is to provide thermal electrochemical cells having nitrate electrolyte and containing certain metal salts as cathodic material, to increase the potential of the cell.

SUMMARY OF THE INVENTION

According to the present invention, it has now been found that addition of certain metal ions in the form of salts to low melting nitrate electrolytes in an electrochemical cell containing a lithium or calcium anode, when activated by heating, produces cathodic currents at cathode potentials significantly more positive than the reversible potential for the metal ion/metal reaction, as in the case of silver salts, as noted above, thereby producing greater cell potentials than previously achieved.

The greatest increase in cell potential is accomplished employing a cathode material comprising $Cu^{++}$, $Fe^{+++}$, $Cr^{+++}$ or $Au^{+++}$ ions and a low melting fused salt nitrate electrolyte such as the eutectic mixture of $LiNO_3$ and $KNO_3$. Other ions such as $Co^{++}$, $Eu^{+++}$, $La^{+++}$, $Ni^{++}$, $Mn^{++}$, $Ce^{+++}$, $Pr^{+++}$, $Nd^{+++}$, $Gd^{+++}$, $Sm^{+++}$ and $Tb^{+++}$ can also be used, but yield smaller cell potentials. Such ions are added in the form of a suitable salt of such metal ions to the low melting fused nitrate salt electrolyte. The cathode materials can be added directly to the fused salt electrolyte at various concentrations, as noted hereinafter.

DETAILED DESCRIPTION OF THE INVENTION AND PREFERRED EMBODIMENTS

The cathode material comprising one or more of the above ions, or mixtures thereof, is added to the low melting fused nitrate electrolyte in the form of a salt which is soluble in the electrolyte, such as a nitrate or a halide, e.g. chloride, salt, and diffuses in the electrolyte.

The following metal salts have been found useful as a source of the desired metal ions in the nitrate melts: $CuCl_2$, $CuBr_2$, $FeCl_3$, $Fe(NO_3)_3$, $CrCl_3$, $AuCl_3$, $Co(NO_3)_2$, $EuCl_3$, $LaCl_3$, $Ni(NO_3)_2$, $MnCl_2$, $CeCl_3$, $PrCl_3$, $NdCl_3$, $GdCl_3$, $Sm(NO_3)_2$, and $TbCl_3$. Any of these cathode materials, such as $CuCl_2$ or $Co(NO_3)_2$, can be added directly to the fused nitrate electrolyte in concentrations ranging from about $2\times10^{-4}$ to about $2\times10^{-1}$ m(molal). The cathodic current increases directly with increase in concentration.

The electrochemical cells of the present invention employ low melting nitrate salts. Generally, mixtures of nitrate salts are employed which melt at temperatures not substantially greater than 200° C. Specific examples of such nitrate electrolyte salts are mixtures such as $LiNO_3/KNO_3$ (42–58 mole %), $LiNO_3/NaNO_3$ (56–44 mole %), $LiNO_3/NaNO_3/KNO_3$ (37.5–18–44.5 mole %) and $LiNO_3/RbNO_3$ (30–70 mole %). Such nitrate electrolytes can also include a nitrite component such as $NANO_2$, e.g. the mixture $LiNO_3/KNO_2$(40–60 mole %). All of such mixtures have melting points below 200° C.

The cells of the present invention preferably are operated at temperatures not greater than about 200° C. Higher temperatures cause decomposition of the nitrate melts in the presence of the added metal ions. Thus, cells of this invention are operated at temperatures between 124° C. and 200° C. The performance of the cathode materials varies in different nitrate electrolyte melts and at different temperatures.

Although applicant is not certain as to the particular theory of operation of the above cathodic materials in the low melting nitrate electrolytes, the increase in the cell potential obtained employing the cathode materials of the invention is achievable because there is no reversible reduction of metal ions to the free metal as in the case of the silver salts. Instead, the metal salt cathode materials of the present invention combine with the low melting nitrates to form nitrato complexes of metal ions which are reduced in irreversible cathodic reactions.

The metal salts comprising the cathode material according to the invention, can be employed in electrochemical cells having Li or Ca anodes because the metal ion of the cathode material is not reduced to the free metal. This prevents any metal film from forming on the anode surface. Instead, the nitrato complexes of the metal ions are reduced to the metal oxide or oxide species such as $FeO^+$. Many of the metal oxide products thus produced in the present invention are sufficiently soluble in the electrolyte melt, and do not passivate the cell electrodes, and the cathode materials hereof can accordingly be allowed to mix with the electrolyte throughout the entire cell.

The metal salts of which cathode materials are comprised can be used in conjunction with other cathodic materials such as silver salts, e.g. $AgNO_3$, that undergo reduction to silver metal. Under these circumstances, a small concentration of silver salt not to exceed the concentration of the metal salt cathode material hereof should be employed, e.g. a proportion of about 0.01 to about 1 mole of silver salt per mole of metal salt cathode material, and it is essential that the silver ion be kept near the cathode or cathode collector, so it does not plate out on the anode. Many metal ion additives of the present invention, $Cu^{++}$, $Fe^{+++}$, $Cr^{+++}$, and $Au^{+++}$, give cathodic reactions positive to the $Ag^+/Ag$ cathode reaction.

In the electrochemical cell of the present invention the low melting nitrate electrolyte containing the metal salt cathode materials hereof is disposed between a lithium or calcium anode, and a cathode, which can be in the nature of a metal current collector such as a nickel screen, with electrical connections to the anode and the cathode. However, if desired, the metal salt cathode material can be used as a solid cathode laver in the electrolyte in solid form, spaced from the anode, and adjacent to the cathode current collector, instead of being added directly to the electrolyte melt.

According to a preferred embodiment of the invention, providing a thermal battery cell with a lithium anode, a nickel screen cathode current collector spaced from the anode, and a $LiNO_3/KNO_3$ electrolyte containing $CuCl_2$ cathode material in a concentration of 0.02 m with respect to the electrolyte, the electrolyte can be provided as a disc such as of fiberglass filter paper with the electrolyte containing the cathodic materials absorbed thereon. Such electrolyte can be prepared by dipping the disc into the molten electrolyte having the $CuCl_2$ cathode material diffused therein, removing and allowing the electrolyte to solidify. The treated fiberglass discs are then placed with their flat surfaces adjacent to each other and sandwiched between the anode and cathode to form the cell as described above.

The following are examples of practice of the invention:

EXAMPLE 1

$CuCl_2$ as Cathode Material

Cyclic voltammetric studies at 50 mV/s (millivolts per second) of 0.020 m $CuCl_2$ in $LiNO_3/KNO_3$ (42–58 mole %), electrolyte m.p.=124° C.) at 180° C. show dramatic increases in the electrochemical reactivity of the $LiNO_3/KNO_3$ melt. Reduction waves for the melt begin near +0.3 V (vs. $Ag^+/Ag$). From the results of the cyclic voltammetric studies, a thermally activated electrochemical cell constructed having a Li anode, $LiNO_3/KNO_3$ electrolyte (mole fraction $KNO_3$=0.58, m.p.=124° C.) and a $CuCl_2$ cathode will have an open circuit potential (Eoc)=3.7 V at 180° C. Current densities of 4 mA/cm$^2$ can be achieved for 0.02 m $CuCl_2$ and densities of 20 mA/cm$^2$ can be achieved for 0.1 m $CuCl_2$. A cell potential of 3.4 V at 20 mA/cm$^2$ can be achieved for 0.1 m $CuCl_2$.

EXAMPLE 2

$FeCl_3$ as Cathode Material

Cyclic voltammetric studies at 50 mV/s of 0,020 m $FeCl_3$ in $LiNO_3/KNO_3$ (42–58 mole %) electrolyte, m.p.=124° C.) at 180° C. show dramatic increases in the electrochemical reactivity of the $LiNO_3/KNO_3$ melt. Reduction waves for the melt begin near +0.6 V (vs. $Ag^+/Ag$). From the results of the cyclic voltammetric studies, a thermally activated electrochemical. cell constructed having a Li anode, $LiNo_3/KNO_3$ electrolyte (mole fraction $KNO_3$=0.58, m.p=124° C. and a $FeCl_3$ cathode material would have an Eoc=4.0 V at 180° C. Current densities of 2 mA/cm$^2$ can be achieved for 0.02 m $FeCl_3$. A cell potential of 3.8 V at 10 mA/cm can be achieved for 0.1 m FeC13.

EXAMPLE 3

$AuCl_3$ as Cathode Material

From cyclic voltammetric studies similar to Examples 1 and 2, employing the same nitrate electrolyte and the same Li anode as seen in Examples 1 and 2, but using $AuCl_3$ as cathode material, the cathodic wave begins at +0.8 V (vs. $Ag^+/Ag$). As set forth in the previous examples, a cell constructed having 0.02 m $AuCl_3$ will have an Eoc=4.2 V at 180° C. A cell potential of 3.8 V can be achieved at a current density of 10 mA/cm$^2$ for 0.1 m $AuCl_3$.

EXAMPLE 4

$Ni(NO_3)_2$ as Cathode Material

From studies similar to Examples 1 and 2, a new cathodic wave begins at −0.3 V (vs. $Ag^+/Ag$) for 0.02 m $Ni(NO_3)_2$ added to the $LiNO_3/KNO_3$ melt at 180° C. Therefore, a thermally activated cell constructed with a lithium anode and 0.02 m $Ni(NO_3)_2$ in $LiNO_3/KNO_3$ will have an Eoc=3.1 V at 180° C. A cell potential of 2.4 V can be achieved at 25 mA/cm$^2$ for 0.1 m $Ni(NO_3)_2$.

EXAMPLE 5

$Co(NO_3)_2$ as Cathode Material

From cyclic voltammetric studies similar to Examples 1 and 2, the cathodic wave begins at −0.4 V (vs. $Ag^+/Ag$) with 0.02 m $Co(NO_3)_2$ added to the $LiNO_3/KNO_3$ melt at 180° C. Therefore, a cell constructed with a lithium anode and 0.02 m $Co(NO_3)_2$ will yield an Eoc=3.0 V at 180° C. A cell potential of 2.5 V can be achieved at a current density of 20 $mA/cm^2$ for 0.1 m $Co(NO3)_2$.

EXAMPLE 6

$EuCl_3$ as Cathode Material

From cyclic voltammetric studies similar to Examples 1 and 2, a new cathodic wave begins at −0.5 V (vs. $Ag^+/Ag$) with 0.02 m $EuCl_3$ added to the $LiNO_3/KNO_3$ melt at 180° C. Therefore, a cell constructed with a lithium anode and 0 02 m $EuCl_3$ will have an Eoc=2.9 V at 180° C. A cell potential of 2.4 V can be achieved at a current density of 10 $mA/cm^2$ for 0.1 m $EuCl_3$.

EXAMPLE 7

$MnCl_2$ as Cathode Material

From cyclic voltammetric studies similar to Examples 1 and 2, the new cathodic wave begins at −0.6 V (vs. $Ag^+/Ag$) when 0.02 m $MnCl_2$ is added to the $LiNO_3/KNO_3$ melt at 180° C. Therefore, a cell constructed with a lithium anode and 0.02 m $MnCl_2$ in $LiNO_3/KNO_3$ will have an Eoc=2.8 V. A cell potential of 2.5 V can be achieved at a current density of 25 $mA/cm^2$ for 0.1 m $MnCl_2$ as the active cathode material.

The present invention has the novel feature of producing cathodic currents at potentials significantly more positive than the potential of certain electrode reactions, thereby producing greater cell potentials than could be previously achieved.

This is believed due to the formation of nitrato-complexes with the metal ions that allows the nitrate ions to be reduced more readily. Negative electrons can be transferred more readily to nitrate ions that are associated with positive metal ions. The complexed nitrate ions can then be reduced at potentials more positive than potentials where reduction of metal ions occur.

The effects of increased cell potential have been observed using the cathode materials of the invention at various concentrations in low melting nitrate electrolytes by adding the cathode materials directly to the electrolyte melt. The use of the cathode materials of the invention does not interfere with the lithium or calcium anodes employed. As previously noted, the use of the cathodic materials of the invention can be practiced in conjunction with other cathodic materials such as silver salts, which undergo reduction to the free metal.

Since various changes and modifications can be made in the invention without departing from the spirit of the invention, the invention is not to be taken as limited except by the scope of the appended claims.

What is claimed is:

1. A thermal electrochemical cell comprising a low melting nitrate electrolyte which is a non-conductive solid at ambient temperature and is capable of becoming an ionically conductive liquid upon being heated above its melting point, a cathode material in said electrolyte, said cathode material comprising a metal ion selected from the group consisting of $Cu^{++}$, $Fe^{+++}$, $Cr^{+++}$, $Au^{+++}$, $Co^{++}$, $Eu^{++}$, $La^{+++}$, $Ni^{++}$, $Mn^{++}$, $Ce^{+++}$, $Pr^{+++}$, $Nd^{+++}$, $Gd^{+++}$, $Sm^{+++}$ and $Tb^{+++}$ ions and mixtures thereof, and an anode in contact with said electrolyte, and selected from the group consisting of Li and Ca anodes.

2. The thermal cell of claim 1, said nitrate electrolyte having a melting point and being capable of activation at temperatures not greater than about 200° C.

3. The thermal cell of claim 1, said nitrate electrolyte being selected from the group consisting of mixtures of (1) $LiNO_3$ and $KNO_3$, (2) $LiNO_3$ and $NaNO_3$, (3) $LiNO_3$, $NaNO_3$ and $KNO_3$ and (4) $LiNO_3$ and $RbNO_3$.

4. The thermal cell of claim 3, said nitrate electrolyte being a $LiNO_3$, $KNO_3$ mixture.

5. The thermal cell of claim 1, said nitrate electrolyte including a nitrite.

6. The thermal cell of claim 1, wherein said cathode material is a salt containing said metal ion.

7. The thermal cell of claim 2, wherein said cathode material comprises a metal ion selected from the group consisting of $Cu^{++}$, $Fe^{+++}$, $Cr^{+++}$ and $Au^{+++}$.

8. The thermal cell of claim 6, wherein said cathode material is selected from the group consisting of nitrate and halide salts of said metal ion.

9. The thermal cell of claim 6, wherein the concentration of said cathode material in said electrolyte ranges from about $2\times10^{-}$to about $2\times10^{-}$molal.

10. The thermal cell of claim 7, wherein said cathode material is a soluble salt of said metal ion selected from the group consisting of nitrate and chloride salts.

11. The thermal cell of claim 6, wherein said electrolyte is $LiNO_3/KNO_3$, and wherein the concentration of said cathode material is said electrolyte ranges from about $2\times10^{-4}$ to about $2\times10^{-1}$ molal.

12. The thermal cell of claim 6, and including a cathode current collector in contact with said electrolyte and spaced from said anode.

13. The thermal cell of claim 6, said metal salt cathode material comprising a solid layer in said electrolyte spaced from said anode.

14. The thermal cell of claim 9, said cathode material also including a silver salt in a proportion of about 0.01 to about 1 mole per mole of said salt containing said metal ion.

15. The thermal cell of claim 10, wherein said electrolyte is $LiNO_3/KNO_3$, and wherein the concentration of said cathode material in said electrolyte ranges from about $2\times10^{-4}$ to about $2\times10^{-1}$ molal.

16. In a thermal electrochemical cell comprising an anode, a cathode and an electrolyte disposed between said anode and said cathode, a low melting nitrate electrolyte which is a non-conductive solid at ambient temperature and is capable of becoming an ionically conductive liquid upon being heated above its melting point, said nitrate electrolyte having a melting point and being capable of activation at temperatures not greater than about 200° C., a cathode material diffused in said electrolyte, said cathode material comprising a metal ion selected from the group consisting of $Cu^{++}$, $Fe^{+++}$, $Cr^{+++}$, $Au^{+++}$, $Co^{++}$, $Eu^{+++}$, $La^{+++}$, $Ni^{++}$, $Mn^{++}$, $Ce^{+++}$, $Pr^{+++}$, $Nd^{+++}$, $Gd^{+++}$, $Sm^{+++}$ and $Tb^{+++}$, and mixtures thereof, and an anode in contact with said electrolyte, and selected from the group consisting of Li and Ca anodes.

17. The thermal cell of claim 16, and including a cathode current collector in contact with said electrolyte and spaced from said anode.

18. The thermal cell of claim 17, said nitrate electrolyte being selected from the group consisting of mixtures of (1) $LiNO_3$ and $KNO_3$, (2) $LiNO_3$ and $NANO_3$, (3) $LiNO_3$, $NaNO_3$ and $KNO_3$ and (4) $LiNO_3$ and $RbNO_3$; and said cathode material is a salt containing said metal ion.

19. The thermal cell of claim 17, said nitrate electrolyte being a $LiNO_3$, $KNO_3$ mixture, and wherein said cathode material is a soluble salt of said metal ion selected from the group consisting of nitrate and chloride salts.

20. The thermal cell of claim 19, wherein the concentration of said cathode material in said electrolyte ranges from about $2\times10^{-4}$ to about $2\times10^{-1}$ molal.

* * * * *